United States Patent [19]
Young

[11] Patent Number: 5,797,487
[45] Date of Patent: Aug. 25, 1998

[54] LOCKABLE COMPACT DISK STORAGE APPARATUS

[76] Inventor: Alan Young, 505 Masters Dr., Blackwood, N.J. 08012

[21] Appl. No.: 722,474

[22] Filed: Sep. 27, 1996

[51] Int. Cl.$^6$ ....................................... B65D 85/57
[52] U.S. Cl. ................ 206/308.2; 206/307; 211/4; 211/41.12; 312/9.48; 312/216
[58] Field of Search ................ 206/1.5, 307, 308.1, 206/308.2, 387.15; 211/4, 41.12; 312/9.47, 9.48, 9.51, 216, 219, 220

[56] References Cited

U.S. PATENT DOCUMENTS

| | | | |
|---|---|---|---|
| 2,987,358 | 6/1961 | Roberts | 312/216 |
| 3,856,373 | 12/1974 | Tucich | 312/216 |
| 4,243,142 | 1/1981 | Foreman | 206/387.15 |
| 4,598,964 | 7/1986 | Frink et al. | 312/216 |
| 4,629,263 | 12/1986 | Hendriks | 312/216 |
| 4,929,861 | 5/1990 | Metcalf | 206/387.15 |
| 5,103,659 | 4/1992 | Benefield, Sr. | 312/216 |
| 5,390,787 | 2/1995 | Macasaet | |
| 5,393,135 | 2/1995 | Tisbo | |

*Primary Examiner*—Jimmy G. Foster
*Attorney, Agent, or Firm*—Massinger Law Office

[57] ABSTRACT

A storage apparatus for storing a collection of compact discs and other recording media in an orderly manner and containing a locking assembly to prevent the unwanted removal of individual compact disc storage cases. The storage apparatus is fashioned generally from top, bottom, back and side walls with the front of the apparatus being open for insertion and removal of compact discs. A plurality of side rails are organized on each side wall such that compact disc storage cases may be held horizontally in a coplanar relationship. The security assembly is described in various embodiments, each having in common the ability to prevent removal of the compact disc storage cases while simultaneously permitting the informative labels contained in the cases to be viewed for easy identification.

2 Claims, 4 Drawing Sheets

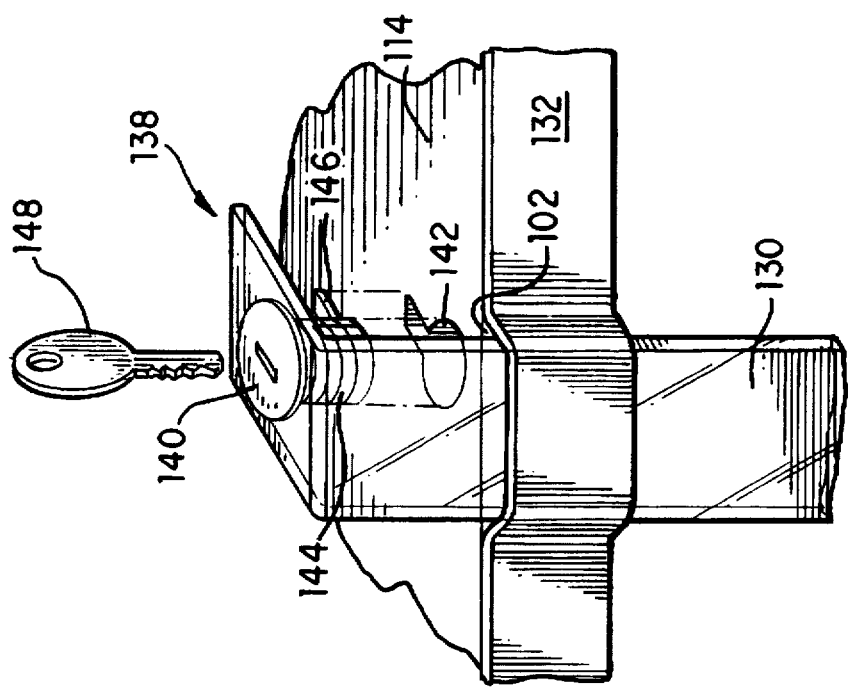
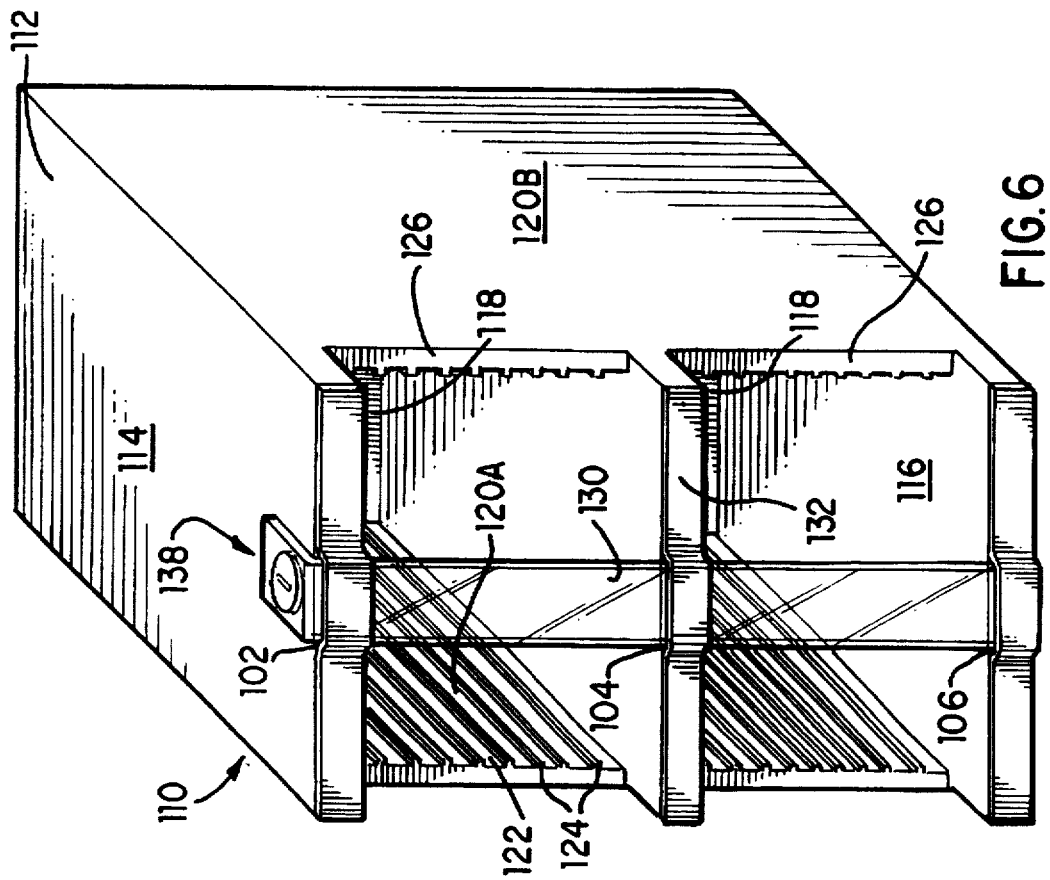

LOCKABLE COMPACT DISK STORAGE APPARATUS

FIELD OF THE INVENTION

The subject invention relates to compact disk storage containers in general, and to an improved lockable CD storage apparatus, in particular.

BACKGROUND OF THE INVENTION

The collection of compact disks is now a commonplace activity for the general public. Used for the storage of music (the "CD") or other forms of digital data read by computers or video games (the "CD-ROM"), compact disks are conventionally sold and stored in clear, hard plastic containers called "jewel" cases. Each jewel case has a relatively planer configuration and houses the CD as well as printed media which may be viewed through the top, bottom and one side of the case, typically to identify its contents. For purposes of simplicity, the terms "CD" or "compact disk" as used herein refer to both the jewel case and the actual compact disk which it houses unless otherwise specified.

Because of their planer configuration, the most logical manner in which to store a collection of CD's is to place them in a container in coplanar orientation; one on top of another. By doing so, neither the top or bottom panels of the compact disk may be viewed, leaving only the label appearing on the thin side edge of the case for content identification. It is this edge of the compact disk storage case that is almost always exposed to the outside of any collection storage apparatus. In may cases, the CD's are placed within such storage containers in alphabetical order, particularly for larger collections, to facilitate identification of a particular selection to be removed.

In addition to the ability to view the identification labels of compact disk storage cases when placed in a collection storage apparatus, it is also desirable in many instances to secure the contents of the storage apparatus from unwanted removal. Compact disks are relatively expensive when they store music, and even more so when they store data for use with computers or video games. Parents who want to restrict access to CD games or their personal music collection by children require a storage unit that can be locked. Similarly, students who share common space in dormitories or people who share apartment space may also wish to prevent parts of their collection from being permanently borrowed or just plain pilfered. Unfortunately, despite the myriad of compact disk storage devices available today, most do not contain security features, and those that do are designed in such a manner that the ability to simultaneously view individual compact disk cases is impossible when the storage apparatus is locked. This inability to view the collection can be discouraging to the owner who wishes to proudly display the collection. Perhaps more importantly, however, is the inability to quickly locate a particular CD without unlocking the storage assembly. This problem is compounded when the collection is large enough to require the use of multiple CD storage units, each one of which must be unlocked until the desired CD is located.

Heretofore, a number of portable compact disk storage containers have been developed which possess security means. For instance, U.S. Pat. Nos. 4,452,390 and 5,051,725 each disclose respective portable security containers that have a lock and key. However, both inventions suffer from significant shortcomings, namely their inability to store recorded media in an organized fashion, and their inability to view the contents which they hold when the apparatus is closed.

Subsequent to the issuance of the above references, U.S. Pat. No. 5,390,787 was issued to Macasaet in 1995 which disclosed a portable, recorded media storage apparatus capable of holding its contents in an organized manner and containing a lockable door assembly for security purposes. Although the Macasaet reference teaches a variety of useful and thoughtful features, it too is incapable of permitting the contents of the apparatus to be viewed when the hinged, solid door assembly is in the closed position, whether locked or unlocked.

It is clear that a significant need exists for a compact disk storage apparatus having security means that do not obstruct the viewability of the unit's contents, and particularly the labels of said contents, whether the security device is in a locked or unlocked state.

While the above mentioned prior art references are useful for their intended purpose, none of them provide security means which, when active, simultaneously permit a user to examine the compact disk collection stored therein. In fact, this applicant is unaware of any prior art which even contemplates this problem, let alone solves it.

The various embodiments of the subject invention, however, obviate the shortcomings of the above described prior art as will be apparent from the detailed description that follows.

SUMMARY OF THE INVENTION

The subject invention more specifically relates to a storage apparatus for storing a collection of compact disks and other recording media in an orderly manner and containing a locking assembly to prevent the unwanted removal of individual compact disk storage cases. The storage apparatus is fashioned generally from top, bottom, back and side walls with the front of the apparatus being open for insertion and removal of compact disks. A plurality of side rails are fixedly attached to each side wall such that compact disk storage cases may be held horizontally in a coplanar relationship and in an organized manner. The security assembly is described in various embodiments, each having in common the ability to prevent removal of the compact disk storage cases while simultaneously permitting the informative labels contained in the cases to be viewed for easy identification of a particular CD.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least two embodiments of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is, therefore, a primary object of the subject invention to provide a new and improved compact disk storage apparatus which is capable of securing compact disks from unwanted removal while simultaneously permitting the labels of compact disk storage cases to be viewed.

Another object of the subject invention is to provide a lockable compact disk storage apparatus which is simple in its design and operation.

It is a further object of the present invention to provide a lockable compact disk storage apparatus capable of storing CD's in an ordered and organized manner.

It is also an object of the present invention to provide a lockable compact disk storage apparatus containing organizational means to facilitate the quick identification and retrieval of a desired CD.

It is also an object of the present invention to provide a lockable compact disk storage apparatus which is relatively inexpensive to manufacture and purchase by the consumer.

Still another object of the subject invention is to provide a compact disk storage apparatus which is of durable and reliable construction.

These together with other objects of the invention, along with the various features of novelty which characterize the invention, are pointed out with particularity in the claims annexed to and forming a part of this disclosure. For a better understanding of the invention, its advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 6 is a perspective view showing a second preferred embodiment of the subject lockable compact disc storage apparatus containing a security insertion bar;

FIG. 7 is an enlarged perspective view of the security assembly of the invention of FIG. 6;

DETAILED DESCRIPTION OF THE INVENTION

Figure 1:
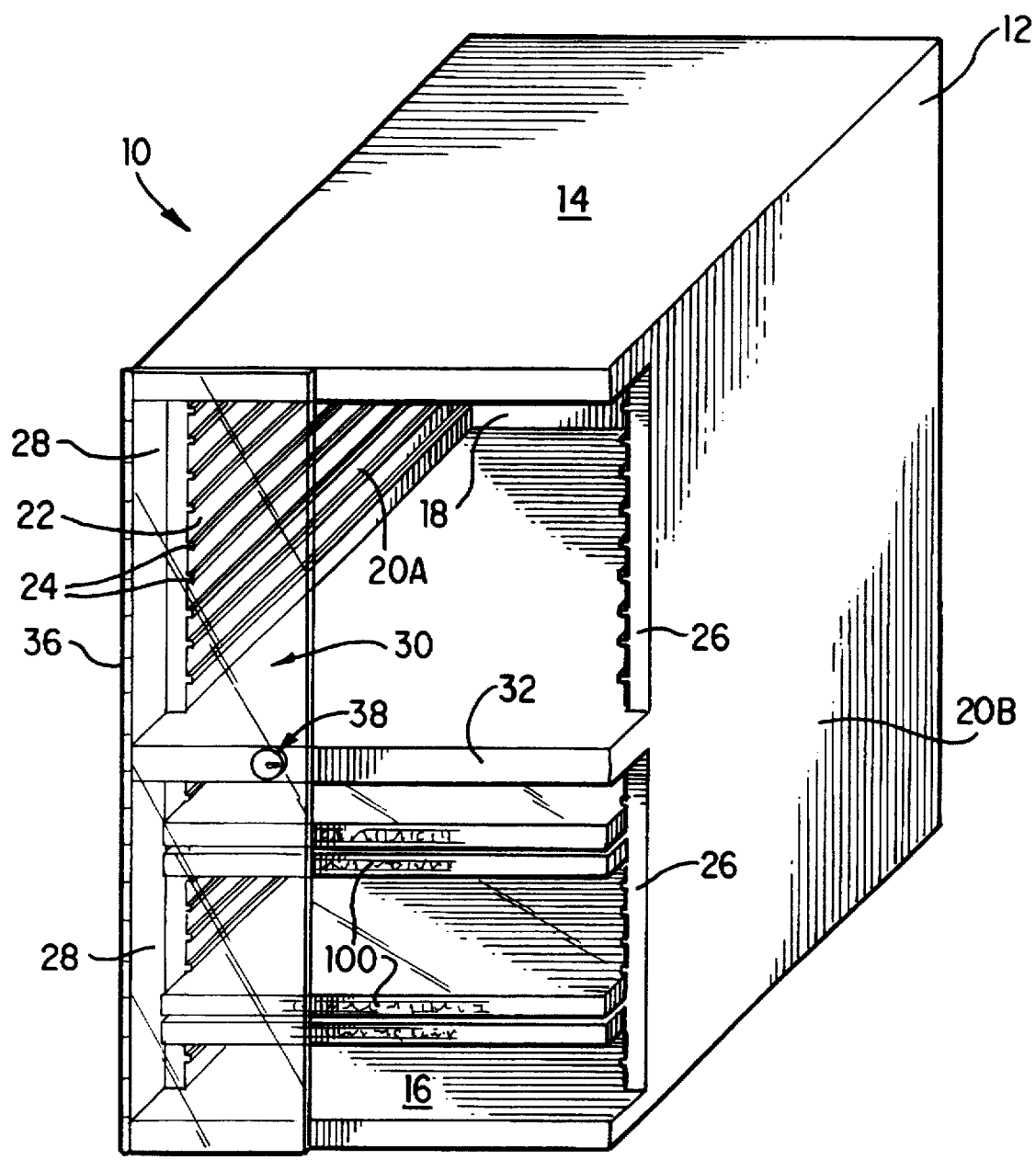
FIG. 1 is a perspective view showing a first preferred embodiment of the subject compact disc storage apparatus.

Upon only a cursory review of the above referenced Figures, it will be apparent that the various embodiments of the subject invention described in detail below have in common several fundamental components. Referring to FIG. 1, there is illustrated a perspective view of one embodiment of the subject lockable compact disc storage apparatus designated generally by reference numeral 10. Each embodiment of CD storage apparatus 10 has in common a housing assembly 12 which may be injection molded or otherwise fabricated to form the desired shapes depicted in the various figures as well as other designs not shown. Housing assembly 12 is fashioned generally from top, bottom, back and side walls designated by reference numerals 14, 16, 18, 20A and 20B, respectively. The front of storage apparatus 10 is open for insertion and removal of compact discs into slots 22 which are comprised of horizontal side rails 24 which run from front to back of side walls 20A and 20B. It may be appreciated that compact discs 100 may be inserted into retention means in the form of slots 22 such that they are stored in coplanar relationship with one another and in an organized fashion.

In each embodiment described herein, it is preferred that side walls 20A and 20B have a length slightly shorter than the depth of a standard compact disc jewel case. By doing so, a portion of the storage case will extend beyond the front edge 26 of housing assembly 12 and thereby facilitate grasping of the storage case by the user for removal.

As mentioned in the foregoing summary, the security assembly of each of the preferred embodiments of the subject compact disc storage apparatus have in common the ability to prevent removal of CD's from the storage apparatus while simultaneously permitting the informative labels contained in the cases to be viewed for easy identification of a particular CD 100. In the first preferred embodiment, the security assembly is comprised of side wall extension 28, hinged security panel 30, cross beam 32 and cam locking assembly 38.

Side wall extension 28 is preferably integrally attached to housing assembly 12 in the injection molding process. Its depth from front to back is slightly greater than the leading edge of compact discs 100 for reasons which will soon be apparent. Depending on its size, housing assembly 12 may be optionally equipped with cross beam 32 which is integrally situated between side walls 20A and 20B, forming a permanent divider between top and bottom portions of storage apparatus 10. Security panel 30 is pivotally attached to side wall extension 28 by hinge 36 and, when in its closed position, lies flush against cross beam 32, the front edges of the top and bottom walls of the housing assembly 12, and the CD's 100 stored within storage apparatus 10. Security panel 30 may be manually opened by rotating same up to 270 degrees about its hinged axis to lie flush against the exterior of side wall 20A or may rest in any position in between. It should be appreciated that the entire security assembly depicted in FIG. 1 may be alternately applied to the opposite side wall 20B.

Figure 2:
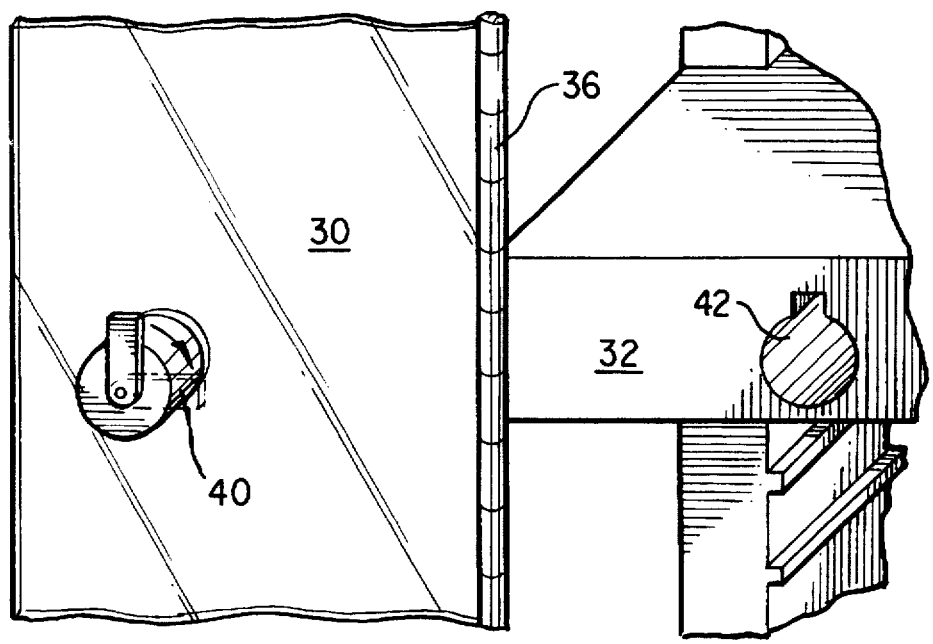
FIG. 2 is an enlarged partial frontal view of the opened security panel and cam locking assembly of the invention of FIG. 1.
Figure 3:
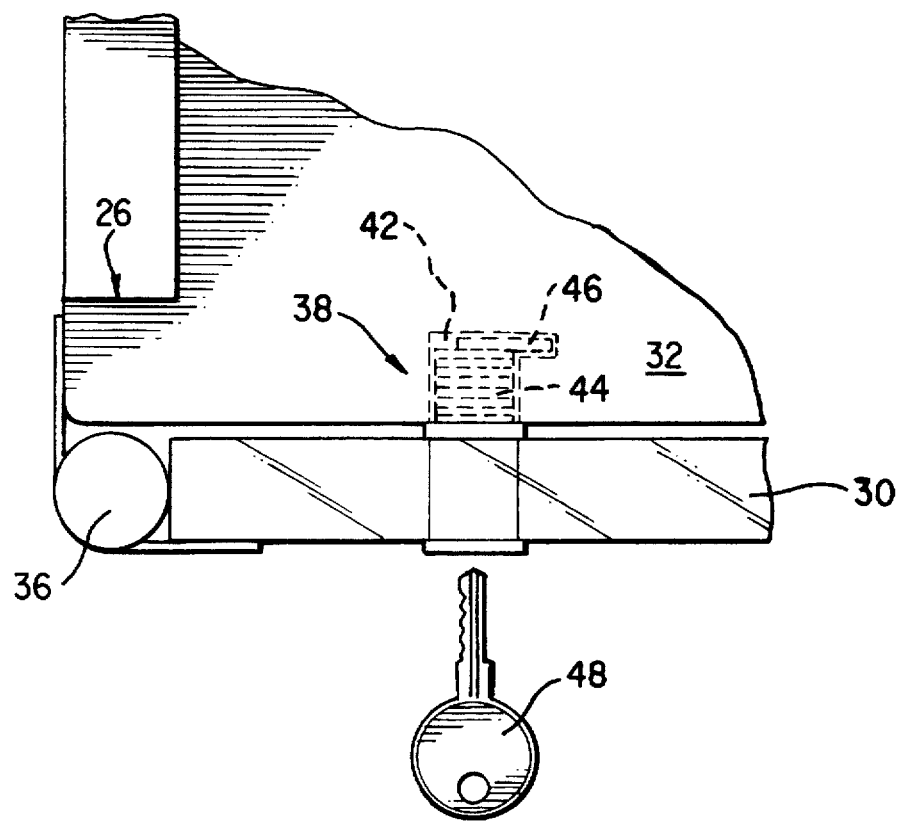
FIG. 3 is a plan view of the cam locking assembly of the invention of FIG. 1.

Security panel 30 may be locked in its closed position to prevent unwanted removal of CD's 100 using cam locking assembly 38, the construction of which is more readily apparent upon reference to FIGS. 2 and 3.

Referring first to FIG. 2, an enlarged partial frontal view of the opened security panel 30 and cross beam 32 are depicted. Cam locking assembly 38 is comprised generally of cam lock 40 fixedly mounted to security panel 30, and slotted aperture 42 located in cross beam 32. Slotted aperture 42 may alternately be located in the top or bottom walls of housing assembly 12, but is preferred in or around the middle of the housing assembly. Referring now to FIG. 3, the two main components of cam lock 40 may be seen in phantom view, namely, the lock cylinder 44 and pivoting cam 46. It should be appreciated upon reference to both FIGS. 2 and 3 that as security panel 32 is pivoted about hinge 36 to engage cross beam 32, cam 46 of cam lock 40 will be inserted into slotted aperture 42 and rotated using key 48 such that cam locking assembly 38 will be locked thus securing security panel 30 in place. It should further be appreciated that other conventional lock types may be used without departing from the scope and spirit of the subject invention, the sole purpose of the security assembly being to prevent unwanted access to CD's 100 stored within compact disc storage apparatus 10.

Referring once again to FIG. 1, it may be observed that security panel 30 is in the closed or locked position, however the entire identification labels of compact discs 100 remain visible and unobscured. Security panel 30 is preferably constructed of a clear, rigid plastic material having appropriate strength properties to resist breakage and may be reinforced with framing (not shown). Moreover, security panel 30 may be economically enlarged during its construction to cover the entire face of storage apparatus 10 and may be lockable by merely moving the location of slotted aperture 42 on cross beam 32 or elsewhere on housing assembly 12. It should be apparent that the security assembly of the subject invention will provide a reasonable deterrent to unwanted removal of CD's by children, roommates, visitors and other would be miscreants, while simultaneously providing the owner with the advantage of constant viewability of the collection within.

Figure 4:
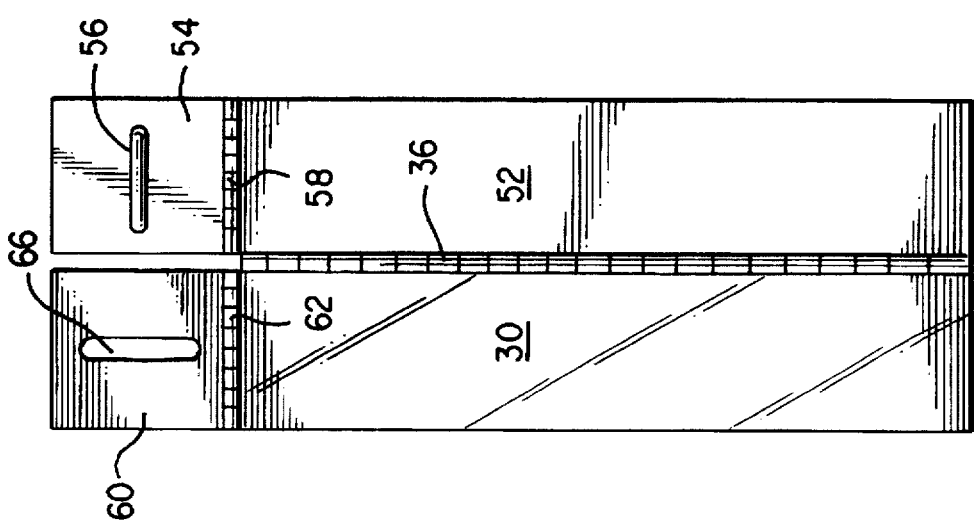
FIG. 4 is a frontal view of the security panel of FIG. 1 together with a hasp locking assembly.

Applicant recognizes that owners of conventional unsecured compact disc storage units may find it desirable to enjoy the benefits and advantages of the subject invention without discarding their current storage units which may have considerable value. Reference now being made to FIG. 4, a frontal view of a security assembly capable of being affixed to conventional CD storage units is depicted.

The security assembly 50 of FIG. 4 is intended to be sold separate and apart from the housing assembly heretofore described, and instead permanently installed onto conventional CD storage units. Security assembly 50 is comprised of security panel 30 hingedly attached to attachment panel 52 via hinge 36. Security panel 30 is identical in form and function to that depicted in FIG. 1. Attachment panel 52 is preferably constructed of a strong light weight resin or plastic material capable of coloration by conventional methods. A staple assembly plate 54 has fixedly mounted thereon U-shaped staple member 56. Staple assembly plate 54 is hingedly attached to attachment panel 52 via staple assembly hinge 58. A slotted hasp plate 60 is hingedly mounted to security panel 30 via hasp plate hinge 62.

Figure 5:
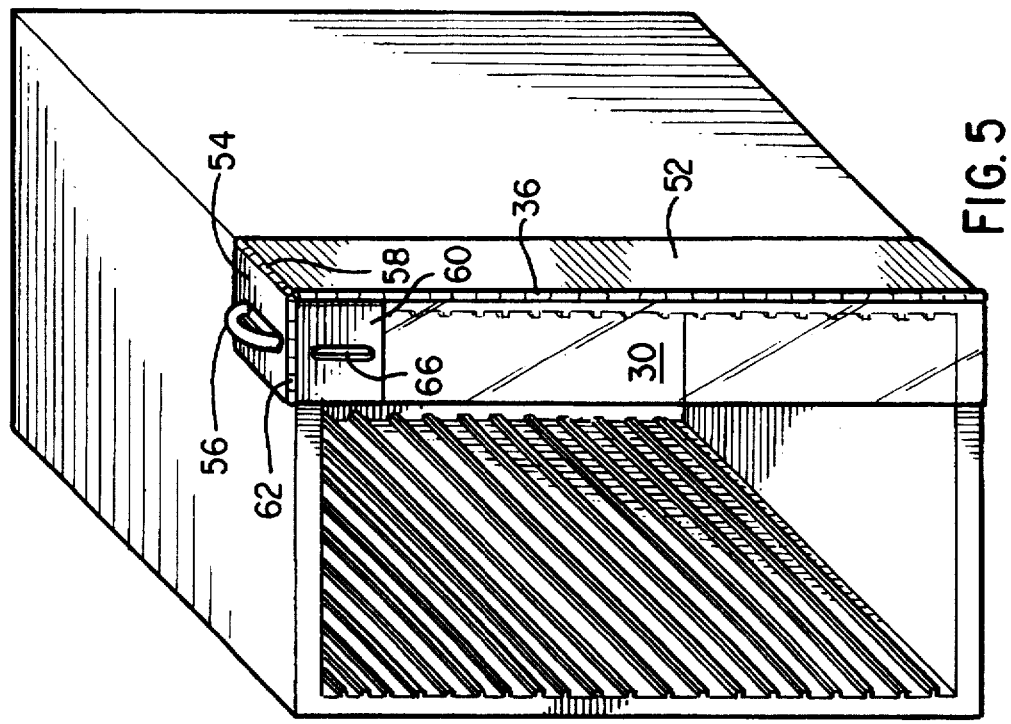
FIG. 5 is a perspective view of the security panel and hasp locking assembly of FIG. 4 as applied to a conventional compact disc storage unit.

Referring now to FIG. 5, a perspective view of the above described security assembly as applied to a conventional compact disc storage unit is depicted. Attachment panel 52 may be permanently mounted to the outer surface of side wall 20B of any conventional CD storage unit using an appropriate fixative. Similarly, once attachment panel 52 is mounted, staple assembly plate 54 may be positioned over and mounted to the outer surface of top wall 14. As may now be readily apparent, slotted hasp plate 60 may then be rotated down upon staple assembly plate 54 such that staple member 56 protrudes through slot 66 of hasp plate 60. The security assembly may now be locked with a conventional padlock (not shown).

Referring now to FIG. 6, a third preferred embodiment of the subject lockable compact disc storage apparatus containing a security insertion bar is depicted. This embodiment of a lockable CD storage apparatus 110 is also comprised, in part, of a housing assembly 112 having top 114, bottom 116, rear wall 118 and left and right side walls 120A and 120B, respectively. A cross beam 132 may be optionally provided, as well as compact disc receiving slots 122 formed from a plurality of horizontal side rails 124. Top member 114 and cross beam 132 are each modified with receptacles 102 and 104, respectively. Bottom member 116 is also modified with a receiving well 106.

The security assembly of the third preferred embodiment is comprised of security bar 130 and cam locking assembly 138. Security bar 130 is slidably received within receiving means in the form of receptacles 102 and 104 and terminates in receiving well 106 when the subject CD storage apparatus is to be locked. Security bar 130 may also be constructed of a clear rigid plastic such that the contents of CD labels can be viewed in an unobstructed manner even when the storage apparatus is secured.

FIG. 7 illustrates a more detailed view of the security assembly of the second preferred embodiment. Cam locking assembly 138 is comprised generally of cam lock 140 fixedly disposed within a first terminal end of security bar 130 which is bent at a 90 degree angle such that it lies in coplanar relationship to top 114 of housing assembly 112. The two main components of cam lock 140 may also be seen, namely, lock cylinder 144 and pivoting cam 146. It should be appreciated upon reference to both FIGS. 6 and 7 that as security bar 130 is lowered through receptacles 102 and 104 and inserted into receiving well 106, cam 146 of cam lock 140 will be inserted into slotted aperture 142 and rotated using key 148 such that cam locking assembly 138 will be locked, thus securing security bar 130 in place. Here again, other conventional lock types may be used without departing from the scope and spirit of the subject invention.

Based on the above detailed description of each embodiment of the subject invention, the manner of usage and operation of each should be readily apparent, therefore, no further discussion relative to same is believed necessary. It should, however, be appreciated that the objects of the invention heretofore described have been accomplished by providing a new and improved compact disc storage apparatus that is relatively inexpensive to manufacture, simple in its construction and operation, and which may secure compact discs from unwanted removal while simultaneously permitting the labels of compact disc storage cases to be viewed.

Although the present invention has been described with reference to the particular embodiments herein set forth, it is understood that the present disclosure has been made only by way of example and that numerous changes in details of construction may be resorted to without departing from the spirit and scope of the invention. Thus, the scope of the invention should not be limited by the foregoing specifications, but rather only by the scope of the claims appended hereto.

What is claimed as being new, useful and desired to be protected by Letters Patent of the United States is as follows:

1. A lockable storage apparatus for recorded media comprising:
   a) a housing having top, bottom, back and sidewalls; the interior of said housing being adapted with retention means for the storage of recorded media in an organized manner;
   b) receiving means fixedly attached to the front of said housing;
   c) a security bar capable of removable insertion into said receiving means thereby preventing the removal of recorded media stored within the storage apparatus; and
   d) locking means to prevent the removal of said security bar when said security bar is inserted into said receiving means.

2. The lockable storage apparatus for recorded media of claim 1, wherein said security panel is clear to permit viewing of the labels of recorded media when said security panel is in the closed position.

* * * * *